(12) United States Patent
Van Den Bogaert et al.

(10) Patent No.: US 8,578,020 B2
(45) Date of Patent: Nov. 5, 2013

(54) DYNAMIC MOBILE APPLICATION QUALITY-OF-SERVICE MONITORING AND REPORTING

(75) Inventors: Etienne A. H. Van Den Bogaert, Singapore (SG); Ananda Motte Dit Falisse, Singapore (SG)

(73) Assignee: Empire Technology Development LLC, Wilmington, DE (US)

( * ) Notice: Subject to any disclaimer, the term of this patent is extended or adjusted under 35 U.S.C. 154(b) by 458 days.

(21) Appl. No.: 12/647,256

(22) Filed: Dec. 24, 2009

(65) Prior Publication Data

US 2011/0161484 A1   Jun. 30, 2011

(51) Int. Cl.
*G06F 15/173* (2006.01)

(52) U.S. Cl.
USPC .......................................................... 709/224

(58) Field of Classification Search
USPC .......................................................... 709/224
See application file for complete search history.

(56) References Cited

U.S. PATENT DOCUMENTS

| | | | | |
|---|---|---|---|---|
| 5,644,715 | A * | 7/1997 | Baugher .................... | 709/228 |
| 6,044,211 | A * | 3/2000 | Jain .............................. | 716/102 |
| 6,154,778 | A * | 11/2000 | Koistinen et al. ............. | 709/228 |
| 6,160,804 | A * | 12/2000 | Ahmed et al. ................. | 370/349 |
| 6,175,569 | B1 * | 1/2001 | Ellington et al. ............. | 370/401 |
| 6,317,438 | B1 * | 11/2001 | Trebes, Jr. ..................... | 370/466 |
| 6,446,126 | B1 * | 9/2002 | Huang et al. .................. | 709/226 |
| 6,480,879 | B1 * | 11/2002 | Zinky et al. ................... | 709/201 |
| 6,480,898 | B1 * | 11/2002 | Scott et al. .................... | 709/238 |
| 6,498,788 | B1 * | 12/2002 | Emilsson et al. ............. | 370/342 |
| 6,629,126 | B1 * | 9/2003 | Zinky et al. ................... | 709/201 |
| 6,631,122 | B1 * | 10/2003 | Arunachalam et al. ....... | 370/332 |
| 6,691,148 | B1 * | 2/2004 | Zinky et al. ................... | 709/201 |
| 6,708,189 | B1 * | 3/2004 | Fitzsimons et al. ............ | 1/1 |
| 6,711,141 | B1 * | 3/2004 | Rinne et al. ................... | 370/328 |
| 6,728,365 | B1 * | 4/2004 | Li et al. ......................... | 379/329 |
| 6,742,020 | B1 * | 5/2004 | Dimitroff et al. ............. | 709/217 |
| 6,766,368 | B1 * | 7/2004 | Jakobson et al. ............. | 709/224 |
| 6,807,156 | B1 | 10/2004 | Veres | |
| 6,816,907 | B1 * | 11/2004 | Mei et al. ...................... | 709/229 |
| 6,850,495 | B1 * | 2/2005 | Baum et al. ................... | 370/256 |
| 6,865,609 | B1 * | 3/2005 | Gubbi et al. .................. | 709/230 |
| 6,941,557 | B1 * | 9/2005 | Jakobson et al. ............. | 719/316 |

(Continued)

FOREIGN PATENT DOCUMENTS

| | | |
|---|---|---|
| JP | 2003523132 A | 7/2003 |
| JP | 2003283564 A | 10/2003 |

(Continued)

OTHER PUBLICATIONS

PCT—the International Search Report and the Written Opinion of the International Searching Authority, Feb. 14, 2011.

*Primary Examiner* — Alicia Baturay
(74) *Attorney, Agent, or Firm* — Ren-Sheng International

(57) ABSTRACT

In accordance with embodiments of the present disclosure, a process for determining a quality-of-service for a mobile application running on a mobile device coupled with a mobile network is presented. The process may be implemented to monitor, on an application layer level, a network usage pattern of the mobile application communicating via the mobile network. The process may emulate the network usage pattern of the mobile application by transmitting or receiving test data via the mobile network. And the process may determine the quality-of-service for the mobile application by analyzing the test data being transmitted or received.

20 Claims, 4 Drawing Sheets

(56) References Cited

U.S. PATENT DOCUMENTS

| | | |
|---|---|---|
| 6,985,722 B1 * | 1/2006 | Snelgrove et al. ............ 455/420 |
| 6,993,026 B1 * | 1/2006 | Baum et al. .................. 370/392 |
| 7,076,552 B2 * | 7/2006 | Mandato ....................... 709/226 |
| 7,076,695 B2 * | 7/2006 | McGee et al. ................. 714/47 |
| 7,167,909 B2 * | 1/2007 | Yamamoto .................... 709/223 |
| 7,254,645 B2 * | 8/2007 | Nishi ............................ 709/249 |
| 7,339,891 B2 * | 3/2008 | Binder et al. ................. 370/231 |
| 7,346,896 B2 * | 3/2008 | Kounik et al. ................ 717/134 |
| 7,596,373 B2 * | 9/2009 | McGregor et al. ............ 455/425 |
| 2002/0065922 A1 * | 5/2002 | Shastri .......................... 709/227 |
| 2002/0116545 A1 * | 8/2002 | Mandato et al. ............. 709/328 |
| 2003/0046396 A1 * | 3/2003 | Richter et al. ................ 709/226 |
| 2004/0058652 A1 * | 3/2004 | McGregor et al. ......... 455/67.13 |
| 2005/0157660 A1 * | 7/2005 | Mandato et al. ............. 370/254 |
| 2006/0034185 A1 | 2/2006 | Patzschke |
| 2006/0294112 A1 * | 12/2006 | Mandato et al. ............. 707/100 |
| 2008/0097807 A1 * | 4/2008 | Chang et al. ....................... 705/7 |
| 2008/0293413 A1 * | 11/2008 | Sharif-Ahmadi et al. . 455/435.1 |
| 2009/0227251 A1 | 9/2009 | Lei |
| 2010/0020717 A1 * | 1/2010 | McGregor et al. ............ 370/252 |

FOREIGN PATENT DOCUMENTS

| | | |
|---|---|---|
| JP | 2007228217 A | 9/2007 |
| WO | 200159981 A1 | 8/2001 |
| WO | 2008039962 A2 | 4/2008 |
| WO | 2009078661 | 6/2009 |

* cited by examiner

DYNAMIC MOBILE APPLICATION QUALITY-OF-SERVICE MONITORING AND REPORTING

BACKGROUND

Unless otherwise indicated herein, the approaches described in this section are not prior art to the claims in this application and are not admitted to be prior art by inclusion in this section.

In the field of computer networking, there are various approaches to allocate the limited amount of network resources to serve as many network applications requesting for such network resources as possible. For example, a network application may request for a certain amount of network throughput, as well as a guarantee that any potential delays, jitters, packet droppings, or bit error probabilities associated with a communication session is below a certain level. Frequently, at least some of the requests need to be satisfied for the network application to function properly. In other words, even if high bit rate is available for the network application (e.g., a video streaming application), the network application may still fail to operate properly if the quality of the service provided is poor, such as having high levels of jitters or bit errors. To ensure a high level of performance and service quality for such a network application, merely examining limited aspects of the associated communication session may not be sufficient to detect or address problems affecting performance and service quality.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

SUMMARY

Figure 1:
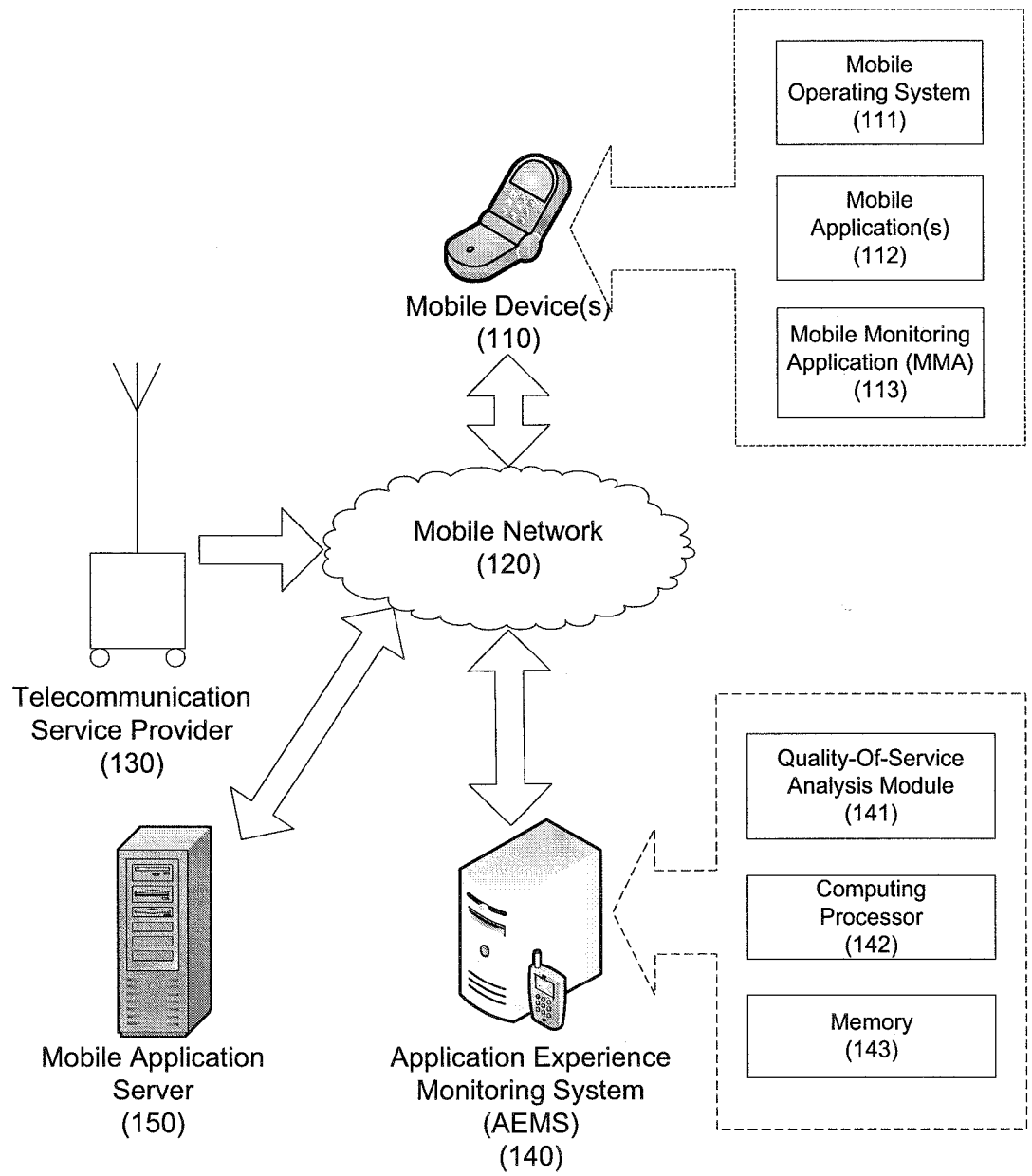
FIG. 1 is a block diagram illustrating an operational environment in which a mobile monitoring application and an application experience monitoring system may be implemented to determine the quality-of-service for a mobile application.

In accordance with one embodiment of the present disclosure, a method for determining a quality-of-service for a mobile application running on a mobile device coupled with a mobile network includes monitoring, on an application layer level, a network usage pattern of the mobile application communicating via the mobile network; emulating the network usage pattern of the mobile application by transmitting or receiving test data via the mobile network; and determining the quality-of-service for the mobile application by analyzing the test data being transmitted or received.

In accordance with another embodiment of the present disclosure, a method for determining a quality-of-service for a mobile application running on a mobile device coupled with a mobile network includes receiving a network usage pattern of the mobile application communicating via the mobile network, wherein the network usage pattern indicates whether the mobile application is transmitting or receiving application data to or from the mobile network; upon a determination that the mobile application is receiving the application data from the mobile network, emulating the network usage pattern of the mobile application by transmitting a first set of test data to the mobile device; receiving, from the mobile device, a second set of test data corresponding to the first set of test data; and determining the quality-of-service for the mobile application by analyzing the first set of test data and the second set of test data.

In accordance with a further embodiment of the present disclosure, a system configured to determine a quality-of-service for a mobile application running on a mobile device includes a monitoring system connected with a mobile network; and a monitoring application running on the mobile device to monitor a network usage pattern of the mobile application communicating via the mobile network, wherein the network usage pattern indicates whether the mobile application is transmitting or receiving application data to or from the mobile network, the monitoring application emulates the mobile application in receiving the application data by receiving a first set of test data from the monitoring system, and the monitoring application determines the quality-of-service for the mobile application by analyzing the received first set of test data.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs, and systems related to dynamic mobile application quality-of-service monitoring and reporting. Throughout the disclosure, the term "quality-of-service", or "QoS," may broadly refer to a determination of the quality of a network communication in terms of bandwidth, signal-to-noise ratios, bit error rate, latency, packet losses on the different network segments (access, metro, and core segments), and other performance measurements. In other words, the quality-of-service for an application running on a computing device may correspond to the quality of the network communication associated with such an application.

For example, a mobile application may have a high quality-of-service when there are ample bandwidth for transmitting the communication data, a high signal-to-noise ratio, a low bit error rate, a low latency, and/or low packet losses for transmitting or receiving the data. Many real-time streaming multimedia applications, such as Voice over IP (VoIP), online videos, or online gaming, etc, may require a network that can guarantee a certain level of quality-of-service in order for the applications to provide a desirable user experience. Further, by determining the quality-of-service for a particular network communication from the perspective of a network application, many actual or potential network problems may be quickly identified or predicted, which in turn could lead to better quality-of-service for the network application once the problems are fixed.

In accordance with at least some embodiments of the present disclosure, a process for determining a quality-of-service for a mobile application running on a mobile device coupled with a mobile network is presented. The process may be implemented to monitor, on an application layer level, a network usage pattern of the mobile application communicating via the mobile network. The process may emulate the network usage pattern of the mobile application by transmitting or receiving test data via the mobile network. And the process may determine the quality-of-service for the mobile application by analyzing the test data being transmitted or received.

In accordance with at least some embodiments of the present disclosure, a network communication device, such as a mobile device, contains various mobile applications that require network communication via a mobile network. To accurately determine the quality-of-service the mobile applications are experiencing during the network communication, a mobile monitoring application (MMA) may be installed and running on the same mobile device, and communicate with a remote application experience monitoring system (AEMS) via the same mobile network. The MMA may monitor the network usage patterns of these mobile applications, and emulate these mobile applications by communicating with the AEMS using the same or similar network usage patterns. For each mobile application, since the MMA is performing a similar type of data transmission using the same networking transmission mechanism and through the same mobile network as the mobile application does, the quality-of-service determined based on the MMA-AEMS communication could correlate and reflect the quality-of-service the mobile application is experiencing at the same time. Therefore, the quality-of-service generated in the real time and simultaneous to the running mobile application could be further evaluated to identify the actual or potential problems the mobile application is encountering, without depending on the mobile application to provide such information.

FIG. 1 is a block diagram illustrating an operational environment in which a mobile monitoring application and an application experience monitoring system may be implemented to determine the quality-of-service for a mobile application, in accordance with at least some embodiments of the present disclosure. In FIG. 1, a mobile device 110 may be configured to communicate with a mobile application server 150 via a mobile network 120. The mobile network 120 may be provided and managed by a telecommunication (Telco) service provider 130. The mobile device 110 may contain, among other things, multiple hardware or software components, such as a mobile operating system 111, one or more mobile applications 112, and a mobile monitoring application (MMA) 113.

In one implementation, the MMA 113 may be configured to monitor the mobile applications 112 and interact with an application experience monitoring system AEMS 140. The AEMS 140 may contain, among other things, a quality-of-service analysis module 141, one or more computing processors 142, and a memory 143. The MMA 113 and the AEMS 140 may be configured to emulate the data communication between the mobile application 112 and the mobile application server 150 by exchanging test data between the MMA 113 and the AEMS 140 via the same mobile network 120, at the same time and using the same network transmission mechanism. The test data may be analyzed to derive the quality-of-service for the network communication between the mobile application 112 and the mobile application server 150. The quality-of-service information may be further used for reporting or detecting potential network communication problems to improve the performance of the mobile application 112.

In one implementation, the mobile device 110 may be configured as a computing device that is capable of communicating with other applications and/or devices in a network environment. The mobile device 110 may be a mobile, handheld, and/or portable computing device, such as, without limitation, a Personal Digital Assistant (PDA), cell phone, and smart-phone. The mobile device 110 may support various mobile telecommunication standards such as, without limitation, Global System for Mobile communication (GSM), Code Division Multiple Access (CDMA), and Time Division Multiple Access (TDMA). The mobile device 110 may also be a tablet computer, a laptop computer, and a netbook that is configured to support wired or wireless communication. For example, the mobile device 110 may be a laptop computer configured with a 3G communication adapter, which takes advantage of 3G mobile telecommunication services provided by the Telco service provider 130.

In one implementation, the mobile device 110 may be configured with the mobile operating system 111, which may also be known as a mobile OS. The mobile OS 111 may be responsible for providing functions to, and supporting communication standards for, the mobile device 110. Examples of the mobile OS 111 include, without limitation, Symbian®, RIM Blackberry®, Apple iPhone®, Windows Mobile®, and Google Android®. The mobile OS 111 also provides the one or more mobile applications 112 and mobile monitoring application 113 a common programming platform, irrespective of the numerous hardware components that the mobile device 110 may be based on.

In one implementation, the mobile device 110 may also contain one or more mobile applications 112. The mobile application 112 may utilize the software and hardware capabilities of the mobile device 110 to perform networking functions such as, without limitation, telephony, email, text-messaging, and web-browsing and/or non-network functions such as, without limitation, audio/video playback, multi-media capturing and editing, and gaming. During operation, the mobile application 112 may communicate with the mobile application servers 150 via the mobile network 120.

In one implementation, the network 120 may be a wired network, such as, without limitation, local area network (LAN), wide area network (WAN), metropolitan area network (MAN), global area network such as the Internet, a Fibre Channel fabric, or any combination of such interconnects. The network 120 may also be a wireless network, such as, without limitation, mobile device network (GSM, CDMA, TDMA, and others), wireless local area network (WLAN), and wireless Metropolitan area network (WMAN). Network communications, such as HTTP requests/responses, Wireless Application Protocol (WAP) messages, Mobile Terminated (MT) Short Message Service (SMS) messages, Mobile Originated (MO) SMS messages, or any type of network messages may be supported among the devices connected to the network 120.

In one implementation, the Telco provider 130 may provide telecommunication services such as telephony and data communications in a geographical area and serve as a common carrier, wireless carrier, ISP, and other network operators at the same time. In one implementation, the mobile device 110, the mobile application server 150, and the AEMS 140 may all subscribe to the services provided by the Telco service provider 130, enabling them to communicate among one another via the mobile network 120.

In one implementation, the mobile application server 150 may be directly connected to the mobile network 120 or indirectly accessed through the mobile network 120 via the Telco service provider 130. The mobile application server 150 may provide telephony, email, or text-messaging services to a specific type of mobile applications 112. It may also act as a streaming server to provide real-time audio/video streaming service to one or more mobile devices 110. The quality-of-service for the mobile application 112 may depend on the throughput of the mobile network 120, the performance of the mobile application server 150, and the performance of the mobile device 110 that is configured to operate the mobile application 112. Although in some situations the Telco service provider 130 may determine the quality-of-service for the mobile network 120, it may not be able to differentiate or evaluate the quality-of-service for a particular mobile application 112 executed by multiple mobile devices 110 or the quality-of-service for multiple mobile applications 112 executed by a single mobile device 110.

In one embodiment, the quality-of-service for the mobile application 112 communicating with the mobile application server 150 via the mobile network 120 may be determined by the MMA 113. The MMA 113 may be configured to perform functions such as determining the type of the mobile application 112 supported in a particular mobile device 110, detecting the initialization and execution of the mobile application 112, monitoring the network usage patterns of the mobile application 112, and/or emulating the mobile application 112 to ascertain quality-of-service indicators. The details of the MMA 113 are further described below.

In one implementation, the AEMS 140 may be configured as a server or a router connected to the mobile network 120 and may communicate with one or more MMA applications 113 running on one or more mobile devices 110 simultaneously. The QoS module 141 in the AEMS 140 may receive requests from the MMA 113, send/receive test data to/from the MMA 113, and/or determine the real-time quality-of-service for the mobile application 112 running on the same mobile device 110 supporting the MMA 113. The quality-of-service result may be reported for status reporting, feature enhancement, and/or debugging purposes. The details of the AEMS 140 and the QoS module 141 are further described below.

In one implementation, the computing processors 142 in the AEMS 140 may be configured to execute programmable instructions to support the general operations of the AEMS 140 and also the QoS module 141 to handle QoS monitoring and reporting. The computing processor 142 may utilize the memory 143 to store the data transmitted to or received from the mobile network 120. Additional components, such as network communication adapters (e.g., Ethernet adapter, wireless adapter, Fiber Channel adapter, or GSM wireless module) may also be implemented in the mobile device 110 and the AEMS 140.

In one implementation, the AEMS 140 may be configured to analyze in detail the performance of the mobile network 120 with respect to the one or more mobile applications 112 that are accessing the mobile network 120. Alternatively, the AEMS 140 may also be integrated with the mobile application server 150 to evaluate the performance of the one or more mobile applications 112 supported by the mobile application server 150.

Figure 2A:
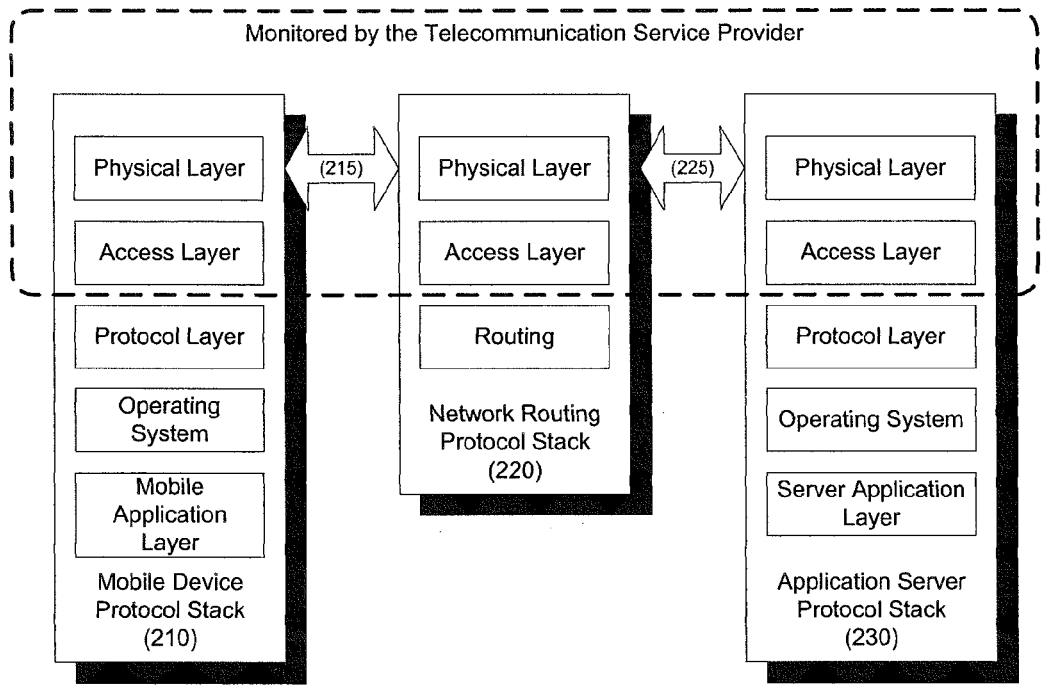
FIG. 2A illustrates network communication protocol stacks that may be utilized by a mobile monitoring application and an application experience monitoring system.

FIG. 2A illustrates network communication protocol stacks that may be utilized by a mobile monitoring application and an application experience monitoring system, in accordance with at least some embodiments of the present disclosure. In FIG. 2A, a mobile device protocol stack 210 may be utilized by a mobile application or a MMA for network communication; a network routing protocol stack 220 may be used by a network routing system; and an application server protocol stack 230 may be implemented by a network application server or an AEMS. Each layer in the three stacks may serve a particular network communication purpose. The different layers in a stack are displayed in a top-down order, where the lower level layers are closer to the physical implementation of the network communication, and the higher level layers are closer to application features.

To illustrate, a mobile application operating on a mobile OS of a mobile device may transmit and receive network communication messages to and from a mobile network. The mobile OS may process the network communication messages based on the mobile device protocol stack 210. For example, a message originated from the mobile application may be encoded, by each of the layers in the mobile device protocol stack 210, into a network message 215 before the network message 215 is transmitted. In other words, the resulting network message 215 may include specific information associated with each of the layers.

Once constructed, the network message 215 may be routed as one or more data packets through various network receivers, repeaters, bridges, and routers across a mobile network before arriving at its destination. Generally, network routing applications, such as the ones implemented by the Telco service provider 130 of FIG. 1, may primarily be responsible for directing data packets from a network source to a network destination. In one implementation, the network routing applications may rely on the physical layer and the access layer of the network routing protocol stack 220 in routing the data packets.

Once a network message 225 arrives at a server, the operating system of the server may decode the network message 225 and extract the message originated from the mobile application based on the application server protocol stack 230. In one implementation, the server application layer of the application server protocol stack 230 and the mobile application layer of the mobile device protocol stack 210 may be configured to be compatible, so that the mobile application and the server application may communicate properly.

As shown in FIG. 2A, since the Telco service provider may have limited understanding of the various protocol stacks (e.g., limited to the physical layer and access layer levels), the Telco service provider may not have the needed information to evaluate quality-of-service associated with network communications at an application layer level for a particular mobile application.

Figure 2B:
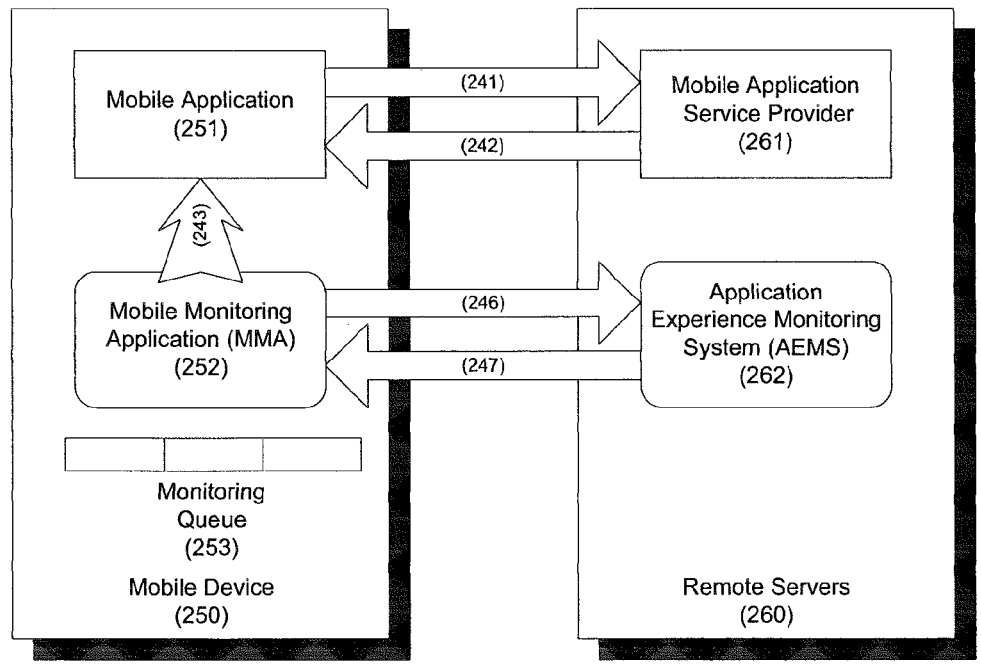
FIG. 2B illustrates scenarios of determining the quality-of-service for a mobile application.

FIG. 2B illustrates scenarios of determining quality-of-service for a mobile application, in accordance with at least some embodiments of the present disclosure. In FIG. 2B, a MMA 252, along with a mobile application 251, may be operating on a mobile device 250, and an AEMS 262 may be implemented in a remote server 260 coupled with a mobile network. The AEMS 262 may be configured to communicate with the MMA 252. The MMA 252 may be designed to detect and monitor the mobile applications 251 utilizing the mobile network. The mobile application 251 may communicate with a mobile application service provider 261. The mobile application 251 and the mobile application service provider 261 may or may not be aware of the presence of the MMA 252 and/or the AEMS 262.

In one implementation, once invoked, the MMA 252 may act as a background process and continuously detect and monitor the one or more mobile applications operating on the mobile device 250. The MMA 252 may monitor the mobile application 251 with respect to, without limitation, the existence and the type of the mobile application 251, the initialization and the execution of the mobile application 251, and/or the network usage patterns associated with the mobile application 251 during a network communication session. For example, the MMA 252 may detect the installed mobile applications, running or not, by application name or Multipurpose Internet Mail Extensions (MIME) type. The MIME information may correspond to file types such as, without limitation, images, sounds, videos, and computer programs. The MMA 252 may also query the mobile OS of the mobile device 250 for the names of the running mobile applications. The MMA 252 may determine the type of mobile application 251 (e.g., a video streaming application) based on the network usage pattern associated with the mobile application 251 (e.g., a network usage pattern indicative of a significant amount of streaming data being downloaded by the mobile application.

In one implementation, the types of mobile application 251 that may be monitored by the MMA 252 and/or the AEMS 262 include, without limitation, VoIP (e.g., Skype®), audio/video streaming, MMS, GPS navigation, video-conferencing, video uploading, email reception, email attachment transmitting and/or receiving, music download/upload, online gaming, and web browsing. For these types of mobile applications, the quality-of-service for the network communication may greatly affect their functionalities and user experience. Therefore, by monitoring these mobile applications and detecting their network usage patterns, the MMA 252 may utilize similar network usage patterns to emulate the real-time quality-of-service experienced by these mobile applications. Further, the MMA 252 may simultaneously perform monitoring and emulation functions on all the running mobile applications that are recognized or supported, and provide individualized and/or comprehensive quality-of-service analysis.

In one implementation, the network usage pattern detected by the MMA 252 with respect to a mobile application 251 may indicate that the mobile application 251 is sending application data 241 to a remote mobile application service provider 261. To emulate such a network usage pattern, the MMA 252 may send a predefined set of test data 246, which may or may not resemble the type of application data 241 sent by the application 251, to the AEMS 262 simultaneous to the sending of the application data 241 by the mobile application 251. Upon receiving the predefined set of test data 246, the AEMS 262 may analyze the received data to measure the network throughput as well as the transmission quality such as signal-to-noise ratio, bit error rate, latency, and packet losses, and determine a quality-of-service that reflects the quality-of-service for the mobile application 251 in sending the application data 241.

In one implementation, the MMA 252 may detect a network usage pattern showing that the mobile application 251 is receiving/downloading application data 242 from the remote mobile application service provider 261. To emulate such a network usage pattern, the MMA 252 may first send a network message to the AEMS 262, requesting the AEMS 262 to send a predefined set of test data back. The network message may indicate the name or type of the mobile application 251 the MMA 252 is monitoring, the type of network usage pattern detected by the MMA 252, as well as the network transmission mechanism used for data exchange. The network transmission mechanism may indicate what type of hardware and/or software the mobile application 251 used for its network communication. Based on this information, the AEMS 262 may select a predefined set of test data that is suitable for emulating the application data downloading 242, and transmit the predefined set of test data using the same network transmission mechanism as the mobile application service provider 261 sending the application data 242 through the same mobile network.

In one implementation, upon receiving the predefined set of monitoring data from the AEMS 262, the MMA 252 may evaluate the received test data to detect any errors that may be introduced during the above mobile network communication. If the MMA 252 has knowledge of the content of the received test data, it may be capable of analyzing the received test data to determine bit error rate, packet losses or signal-to-noise ratio. For example, if the application data sent via 242 is a video stream, the test data sent through 247 may be a recognizable test video stream, and the MMA 252 may process the test video stream to detect any jitter or error that could likely be experienced by the mobile application 251. Based on the test data and the errors detected, a quality-of-service value may be derived from these network performance measurements. The quality-of-service value may then be sent to the AEMS 262 for further purposes.

In one implementation, multiple types of predefined test data may be transmitted to the MMA 252, and different monitoring algorithms may be applied to compile the test data in determining the quality-of-service indicators. Since different mobile applications may have different decoding algorithms or user requirements, the computation of the quality-of-service indicators may be different for these mobile applications. In addition, the MMA 252 may emulate the mobile application 251 by incorporating the decoding or processing algorithms that closely resemble the mobile application. Such an approach may require more processing power from the mobile device 250 during monitoring and emulation.

In one implementation, the MMA 252 may set up one or more monitoring queues 253 to store the transmitted test data for quality-of-service analysis purposes. One monitoring queue may be configured for monitoring a particular mobile application or a specific mobile device. The monitoring queues 253 for different mobile applications may be aggregately analyzed during quality-of-service evaluations. For example, when a certain mobile application is experiencing a low quality-of-service network service, the MMA 252 may check the monitoring queues 253 of other mobile applications to determine whether such a problem is application-specific or mobile device-specific. Alternatively, the AEMS 262 may maintain monitoring queues 253 in its environment for data transmission and quality-of-service evaluations. When communicating with one or more MMAs 252 running on their respective mobile devices 250, the AEMS 262 may initiate a monitor queue for each of the MMAs 252, thereby allowing each MMA 252 to conduct an independent mobile application emulation.

In one implementation, for a particular mobile application being monitored, the MMA 252 and/or the AEMS 262 may implement a utility function specifically tailored to the mobile application for quick quality-of-service calculation and determination. The utility function may be implemented to accept the network performance measurements as input parameters, and generate a quality-of-service value as the quality-of-service output. For example, the utility function may accept input parameters such as, without limitation, bandwidth, packet loss, delay, jitter, and bit-error rate. The output of the utility function may be the quality-of-service indicator showing how well the mobile application performs under the network constraints evidenced by the above input parameters.

In one implementation, when a mobile application 251 ceases to be used on the mobile device 250, the MMA 252 may stop the monitoring and emulating operations accordingly. Further, a network message may be transmitted to the AEMS 262 to stop the monitoring and analyzing of the quality-of-service on the AEMS 262 side. Alternatively, the MMA 252 may be updated from time to time to support the mobile applications that are newly installed on the mobile devices. Similarly, the above approaches may also be adapted by the AEMS 262 to emulate the mobile application service provider 261 in its communication with the mobile applications 251. The quality-of-service determined by the AEMS 262 may be an accurate indicator of the quality-of-service experienced by the mobile application service provider 261 as well.

Therefore, the MMA 252 and the AEMS 262 may emulate the network usage patterns of the mobile application 251 at the application-layer level, and allow the real-time quality-of-service for the mobile application 251 be determined without direct interacting with the mobile application 251 and its respective mobile application service provider 261. Further, the MMA 252 may utilize the same network transmission mechanism as the mobile applications 251. For example, if a mobile application 251 accesses the mobile network via a WiFi adapter, the MMA 252 may access the same WiFi adapter during its emulation. Such an approach is advantageous since the test data may be simultaneously transmitted in a very similar fashion as the real-time application data being transmitted by the mobile application 251. This way, the calculated quality-of-service value may truly reflect the quality of the mobile network communication experienced by the mobile application 251.

Figure 3:
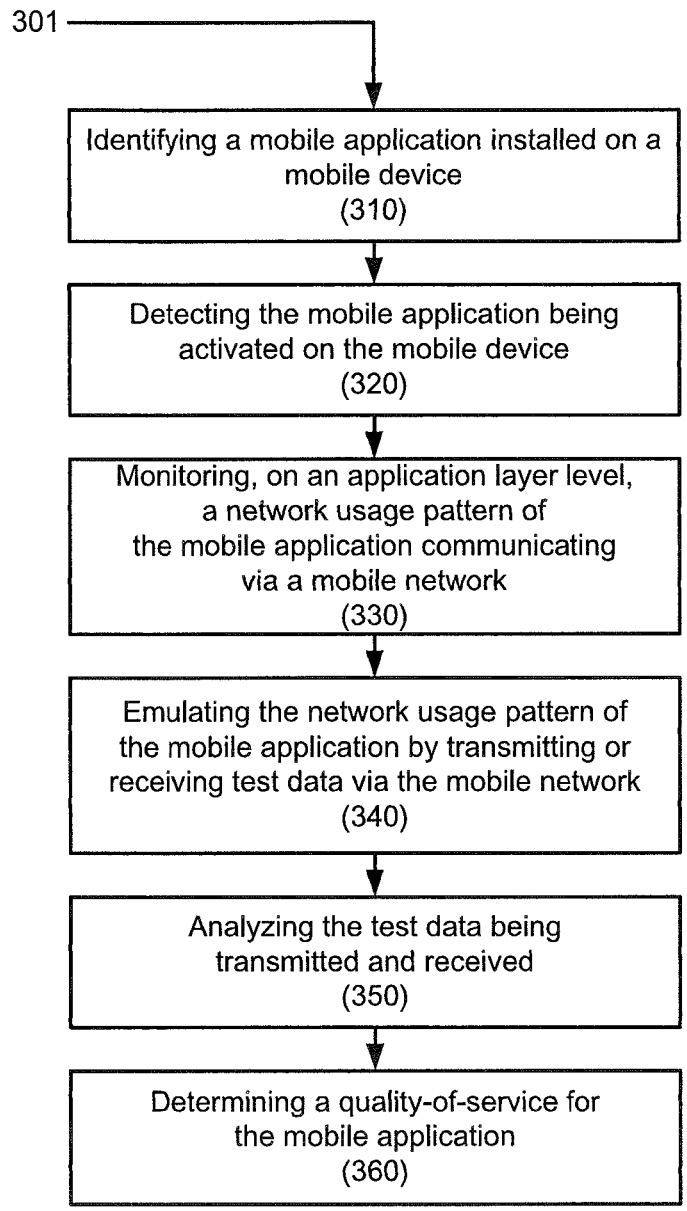
FIG. 3 is a flow diagram illustrating a process for determining mobile application quality-of-service by a mobile monitoring application.

FIG. 3 illustrates a flow diagram of an example process 301 for determining mobile application quality-of-service by a mobile monitoring application, in accordance with at least some embodiments of the present disclosure. The process 301 may be performed by processing logic that may comprise hardware (e.g., special-purpose circuitry, dedicated hardware logic, programmable hardware logic, etc.), software (such as instructions that may be executed on a processing device), firmware or a combination thereof. In one embodiment, machine-executable instructions for the process 301 may be stored in memory, executed by a processor, and/or implemented in a mobile device 110 of FIG. 1.

Process 301 may begin at block 310, "identifying a mobile application installed on a mobile device." Block 310 may be followed by block 320, "detecting the mobile application being activated on the mobile device." Block 320 may be followed by block 330, "monitoring, on an application layer level, a network usage pattern of the mobile application communicating via a mobile network." Block 330 may be followed by block 340, "emulating the network usage patterns of the mobile application by transmitting or receiving test data via the mobile network." Block 340 may be followed by block 350, "analyzing the test data being transmitted and received." And block 350 may be followed by block 360, "determining a quality-of-service for the mobile application." Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

At block 310, a MMA may be running on a mobile device to monitor the mobile applications installed on the same mobile device. The MMA may first identify a mobile application installed or running on the mobile device based on the application name, file type, or its network usage pattern, etc. In addition, the MMA may constantly monitor the mobile OS of the mobile device to detect whether any new mobile application is being installed, or whether an existing mobile application is upgraded or removed. At block 320, a mobile application may be activated on the mobile device. The activation may be performed either manually by a user or automatically by the mobile OS of the mobile device. In one implementation, the MMA may detect the activated mobile application by constantly pulling and retrieving a list of executing processes from the operating system of the mobile device. The MMA may also constantly pull the log files of certain mobile applications for activation indication. Further, a mobile application may be implemented with a trigger, and send a message to the MMA to inform the MMA about its executing status. Once the MMA detects a mobile application being activated, process 301 proceeds to block 330.

At block 330, the MMA may monitor, on an application-layer level, a network usage pattern of the mobile application communicating via a mobile network. The network usage pattern shows whether the mobile application is transmitting or receiving application data via the mobile network. The network usage pattern may also indicate the type and the amount of application data involved in data communication. In one implementation, the MMA may listen to the ports the mobile application used for network communication, and sample or copy the application data passing through these ports for evaluation. Alternatively, the MMA may request from the mobile OS of the mobile device for such information.

At block 340, based on the network usage pattern monitored and detected at block 330, the MMA may emulate the mobile application by transmitting or receiving test data via the mobile network using a similar network usage pattern, and through the same network transmission mechanism, as the mobile application. For example, if the MMA determined that the mobile application is performing downloading of a particular type of application data, then the MMA may select a predefined set of test data that is similar to the type of application data, and conduct the similar network operation on the test data (in this case, to request the predefined test data from an AEMS and perform the downloading of the test data from the AEMS using the same or similar network transmission mechanism). Alternatively, if the MMA detects that the mobile application is uploading application data via the mobile network, then the MMA may emulate the network usage pattern by communicating with the AEMS and uploading similar type of test data via the mobile network.

In one implementation, the test data transmitted or received by the MMA may require additional network and mobile device resources on top of the resources requested by the mobile application, which in turn may affect the quality-of-service experienced by the mobile application. In order to limit the amount of influence to the mobile application, the MMA and the AEMS may use a subsample of the test data, rather than the full set of test data, for data communications. For example, for MEEG decoding, the mobile application may request a large amount of data stream in order to show high-quality video. In this case, instead of transmitting the equal amount of test data during emulation, the MMA may request a subsample of test data that may occupy a fraction (e.g., 1%) of the available bandwidth, and conduct quality-of-service determination based on the transmission of the subsample of test data.

At block 350, the MMA and/or the AEMS may analyze the transmitted test data. The MMA may perform the data analysis on the test data transmitted from the AEMS and received by the MMA. Likewise, the AEMS may analyze the test data transmitted from the MMA and received by the AEMS. In one embodiment, the AEMS may analyze the data originally transmitted from the AEMS to the MMA, and subsequently transmitted back to the AEMS from the MMA. By performing data analysis, network performance measurements such as data transmission bit rate, signal-to-data ratios, bit error rate, latency and packet losses across different network segments of the mobile network (e.g., access segment, metro segment, and core segment) may be determined. Since these network performance measurements are collected and analyzed from an application layer level, they may be used to provide a good overview of the quality-of-service of a complete, rather than a segment or portion of, the network communication path from the perspective of the mobile application.

In one embodiment, if the test data used for mobile application emulation is sampled in order to reduce bandwidth usage, the MMA or the AEMS may "restore" the network performance measurements by multiplication. Since the test data to be transmitted is reduced based on a sample rate (e.g., 1%), the actual number of values detected in the subsample set of test data may be proportionally reduced by the same rate. Thus, by multiplying some or all of the network performance measurements collected from the sampled test data with a rate inversely proportionate to the sample rate, the "restored" values may be used to estimate the performance measurements that may be collected from a full set of test data. For example, for a sample rate of 1%, the number of errors in a full set of test data may be estimated by multiplying the number of defects detected from the sampled data set by an inverse rate (1/sample rate, which is 1/1%=100). In this example, if the error is measured in glitches per minute during emulating with the sampled test data, then the mobile application may experience 1*100=100 glitches per minute in the full set of test data for every glitches per minute detected in the subsample set of test data.

In one implementation, a specific pattern of test data may be sent from the AEMS to the MMA. The specific pattern of test data received by the MMA may be different from the pattern of the original test data, due to the network transmission or network problems. The received test data may then be sent back to the AEMS on a guaranteed delivery channel (e.g., using TCP with retransmissions) to ensure that data is transmitted in a desired order. The later transmitted test data, which preserves the pattern of the test data originally received by the MMA, may be used to compare with the pattern of the original test data. Further, the received pattern may be correlated with potential error-patterns to detect any existing or potential network problems, since different network problems may generate different error patterns.

At block 360, a quality-of-service indicator may be determined by the MMA or the AEMS based on the test data transmitted at block 340 and analyzed at block 350. The quality-of-service, even though generated based on the network communication between the MMA and the AEMS, may be used to reflect the quality-of-service experienced by the mobile application. In one embodiment, the quality-of-service may be computed using a utility function associated with the mobile application. The network performance measurements collected at block 350 may serve as input parameters of the utility function, and the result outputted from the utility function is deemed the quality-of-service for the specific mobile application, and may be delivered to the AEMS for further processing.

In one embodiment, the quality-of-service results collected from one or more MMAs may be sent to the AEMS and stored in a database. The collected current and historical quality-of-service data may be further analyzed to generate a network performance report. In addition, based on the quality-of-service data, a competitive pricing model may be derived by the Telco service provider for accessing the mobile network, with the support of the accurate historical quality-of-service reports.

Figure 4:
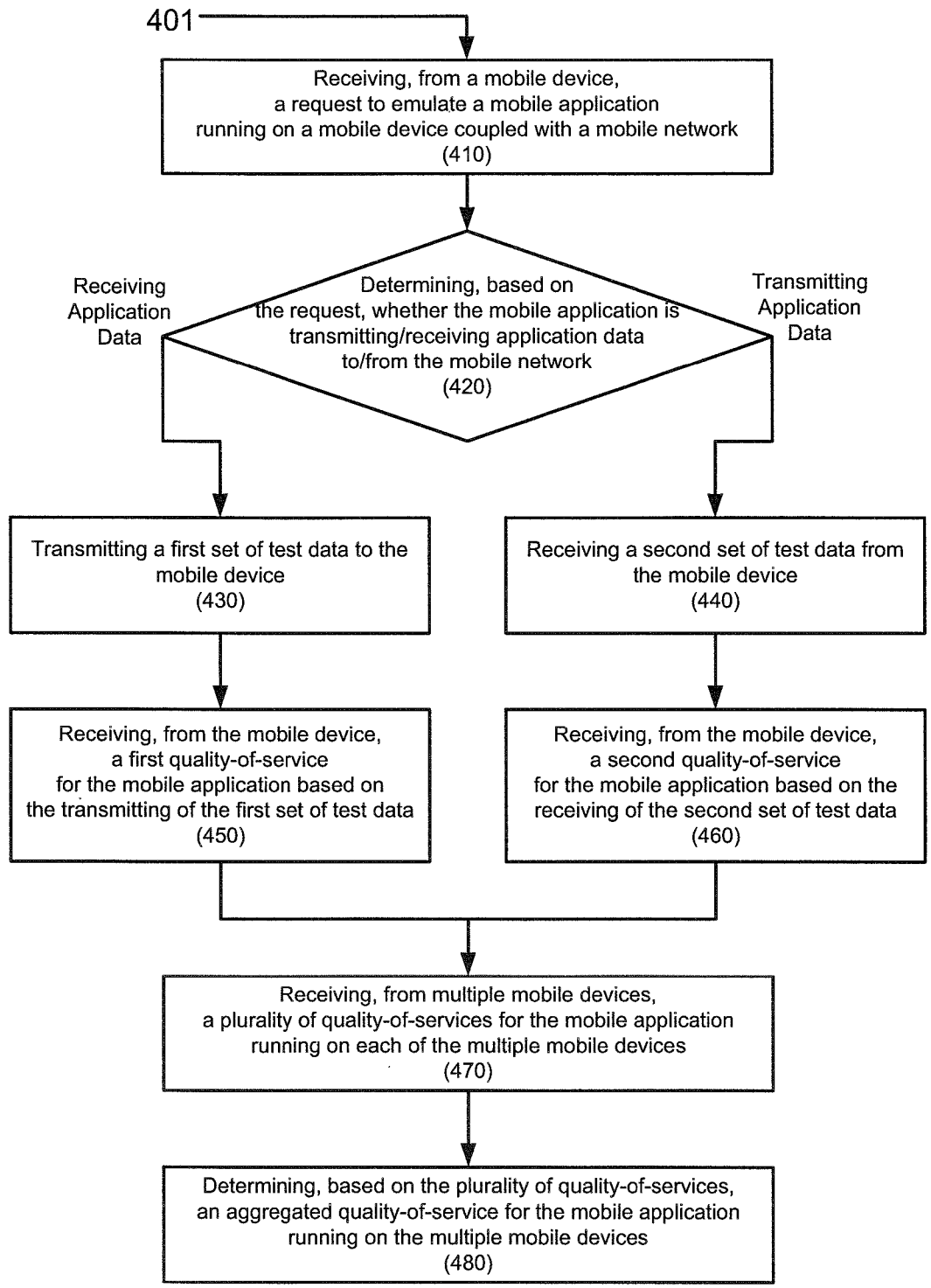
FIG. 4 is a flow diagram illustrating a process for receiving mobile application quality-of-service by an application experience monitoring system; all arranged in accordance with at least some embodiments of the present disclosure.

FIG. 4 illustrates a flow diagram of an example process 401 for receiving mobile application quality-of-service by an application experience monitoring system, in accordance with at least some embodiments of the present disclosure. The process 401 may be performed by processing logic that may comprise hardware (e.g., special-purpose circuitry, dedicated hardware logic, programmable hardware logic, etc.), software (such as instructions that may be executed on a processing device), firmware or a combination thereof. In one embodiment, machine-executable instructions for the process 401 may be stored in memory 143 of FIG. 1, executed by the processor 142 of FIG. 1, and/or implemented in an AEMS 140 of FIG. 1.

Process 401 may begin at block 410, "receiving, from a mobile device, a request to emulate a mobile application running on a mobile device coupled with a mobile network." Block 410 may be followed by a determination block 420, "determining, based on the request, whether the mobile application is transmitting or receiving application data to or from the mobile network." Based on the determination of the block 420, block 420 may be followed by block 430, "transmitting a first set of test data to the mobile device." Block 430 may be followed by block 450, "receiving, from the mobile device, a first quality-of-service for the mobile application based on said transmitting of the first set of test data." Similarly, based on the determination of the block 420, block 420 may be followed by block 440, "receiving a second set of test data from the mobile device." Block 440 may be followed by block 460, "receiving, from the mobile device, a second quality-of-service for the mobile application based on said receiving of the second set of test data." Either block 450 or block 460 may be followed by block 470, "receiving, from multiple mobile devices, a plurality of quality-of-services for the mobile application running on each of the mobile devices." Block 470 may be followed by block 480, "determining, based on the plurality of quality-of-services, an aggregated quality-of-service for the mobile application running on the multiple mobile devices." Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

At block 410, an AEMS may receive a request from an MMA running on a mobile device coupled with a mobile network. The request may trigger the MMA and the AEMS to start an emulation of the mobile application running under actual network loaded conditions, in order to determine the quality-of-service the mobile application may be experiencing. At block 420, based on the request received at block 410, the AEMS may make a determination of whether the mobile application is transmitting or receiving application data via the mobile network. The AEMS and/or the MMA may also determine the type of network transmission mechanism utilized by the mobile application during its data exchanging operation. If it is determined that the mobile application is receiving application data, process 401 may proceed to block 430, in which the AEMS and the MMA may emulate the mobile application's data receiving operation by transmitting a first set of test data from the AEMS to the mobile device. The transmitting of the test data may be performed at the same time as the mobile application receiving its application data, employing the same network transmission mechanism used by the mobile application.

In one implementation, at block 430, the first set of test data may be a predefined set of test data that is tailored to the specific type of mobile application. Alternatively, a reduced amount of test data, or a sub-sampled set of data may be used for emulating the mobile application's receiving process. Once the AEMS finished transferring the first set of test data, the MMA may collect certain performance measurements from the received first set of test data. If the MMA has advance knowledge of the test data, it may perform additional high-level quality-of-service analysis to determine measurements such as the number of glitches per minute on a video stream. Further, if the AEMS transmits a sub-sample set of the test data, then the MMA may multiply the network performance measurements collected from the sub-sample set of test data with an inversed sample rate. The multiplication result may be further used to determine the quality-of-service value.

In other words, a quality-of-service value may be generated by the MMA based on the above receiving of the first set of test data from the AEMS. At block 450, the MMA may send the generated quality-of-service value to the AEMS. Thus, from its perspective, the AEMS may receive from the mobile device a first quality-of-service for the mobile application, which is based on the above transmitting of the first set of test data to the mobile device. Such a quality-of-service value may be used to reflect the quality-of-service for the mobile application experienced during receiving application data via the mobile network.

In one implementation, if the determination at block 420 shows that the mobile application is transmitting application data to the mobile network, process 401 may proceed to block 440, in which a MMA may emulate the mobile application by sending a second set of test data from the mobile device to the AEMS, utilizing the same network transmission mechanism as the mobile application in sending the application data. Thus, at block 440, the AEMS may receive the second set of test data from the mobile device. Based on the transmitting of the second set of test data, the MMA may determine a quality-of-service value, and transmit such quality-of-service value to the AEMS. Thus, at block 460, the AEMS may receive, from the mobile device, a second quality-of-service for the mobile application based on the above receiving of the second set of test data.

In one implementation, at block 470, the AEMS may receive multiple quality-of-services for a particular mobile application from different mobile devices, each quality-of-service being generated by a MMA monitoring and emulating the particular mobile application running on a corresponding mobile device. Therefore, the multiple quality-of-service values, collected from the different mobile devices, may be meaningfully analyzed with respect to the particular mobile application. At block 480, based on the multiple quality-of-service values, an aggregated quality-of-service value may be determined for the particular mobile application, which may be simultaneously running or have been executed within a fixed period of time on these mobile devices. For example, if a mobile application is receiving low quality-of-service values on some of the mobile devices, while having normal or high quality-of-services on other mobile devices, then the potential network issues may be mobile device or mobile network related. In comparison, if all the mobile devices are experiencing low quality-of-service with respect to this particular mobile application, then the problem may be mobile application server or AEMS related. Therefore, by evaluating the aggregated quality-of-service values, the AEMS and the MMA may be able to identify network problems that are otherwise cannot be easily detected by evaluating isolated quality-of-service values or the quality-of-service evaluations that are not on an application-layer level.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or a firmware configuration; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), ARM Processors, CPUs or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of the skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, Flash Memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for determining a quality-of-service for a mobile application running on a mobile device coupled with a mobile network, comprising:
    monitoring, on an application layer level by a monitoring application, a network usage pattern of the mobile application as the mobile application is running on the mobile device and communicating via the mobile network;
    emulating, by the monitoring application, the network usage pattern of the mobile application by transmitting or receiving test data via the mobile network; and
    determining, by the monitoring application, the quality-of-service for the mobile application by analyzing the test data being transmitted or received.

2. The method as recited in claim 1, further comprising:
    identifying the mobile application installed on the mobile device; and
    detecting the mobile application being activated on the mobile device.

3. The method as recited in claim 2, wherein the identifying of the mobile application further comprising:

identifying the mobile application based on the network usage pattern of the mobile application communicating via the mobile network.

4. The method as recited in claim 1, wherein the monitoring of the network usage pattern further comprising:
detecting whether the mobile application is transmitting or receiving application data via the mobile network.

5. The method as recited in claim 4, wherein the emulating of the network usage pattern further comprising:
simultaneously transmitting or receiving the test data via the mobile network when the mobile application is transmitting or receiving the application data.

6. The method as recited in claim 4, wherein the emulating of the network usage pattern further comprising:
upon a determination that the mobile application is transmitting the application data via the mobile network, simultaneously transmitting the test data via the mobile network; and
upon a determination that the mobile application is receiving the application data via the mobile network, simultaneously receiving the test data via the mobile network.

7. The method as recited in claim 1, wherein the emulating of the network usage pattern further comprising:
loading a predefined set of data as the test data; and
transmitting or receiving the predefined set of data to or from a remote monitoring system using the mobile application's network transmission mechanism.

8. The method as recited in claim 1, wherein the emulating of the network usage pattern further comprising:
emulating the network usage pattern by transmitting or receiving a sample of the test data via the mobile network, wherein the sample of the test data is generated by reducing the test data by a sample rate.

9. The method as recited in claim 8, wherein the determining of the quality-of-service for the mobile application further comprising:
multiplying a network performance measurement, collected from the transmitting or receiving of the sample of the test data, with the sample rate.

10. The method as recited in claim 1, wherein the determining of the quality-of-service for the mobile application further comprising:
collecting a plurality of network performance measurements from the transmitting or receiving of the test data; and
determining the quality-of-service for the mobile application based on the plurality of network performance measurements.

11. The method as recited in claim 1, wherein the determining of the quality-of-service for the mobile application further comprising:
evaluating a transmitting pattern of the test data of the test data being transmitted and received; and
identifying a network problem occurring in the mobile network based on the transmitting pattern.

12. The method as recited in claim 1, wherein the method is embodied in a non-transitory machine readable medium as a set of instructions which, when executed by a computing processor, cause the computing processor to perform the method.

13. A method for determining a quality-of-service for a mobile application running on a mobile device coupled with a mobile network, comprising:
receiving, from the mobile device, a first request to emulate the mobile application based on a network usage pattern obtained by monitoring the mobile application as the mobile application is running on the mobile device and communicating via the mobile network, wherein the network usage pattern shows the mobile application is receiving application data from the mobile network using a network transmission mechanism;
emulating the network usage pattern of the mobile application by transmitting a first set of test data to the mobile device using the network transmission mechanism; and
receiving, from the mobile device, the quality-of-service for the mobile application based on the transmitting of the first set of test data.

14. The method as recited in claim 13, further comprising:
receiving, from the mobile device, a second request to emulate the mobile application based on the network usage pattern, wherein the network usage pattern shows the mobile application is transmitting the application data to the mobile network using the network transmission mechanism;
emulating the network usage pattern of the mobile application by receiving a second set of test data from the mobile device using the network transmission mechanism; and
receiving, from the mobile device, the quality-of-service for the mobile application based on the receiving of the second set of test data.

15. The method as recited in claim 14, further comprising:
receiving, from multiple mobile devices, a plurality of quality-of-services for the mobile application running on each of the multiple mobile devices; and determining, based on the plurality of quality-of-services, an aggregated quality-of-service for the mobile application running on the multiple mobile devices.

16. The method as recited in claim 13, wherein the determining of the quality-of-service for the mobile application further comprising:
selecting an utility function associated with the mobile application;
collecting a plurality of network performance measurements from the transmitting of the first set of test data; and
calculating the quality-of-service by inputting the plurality of network performance measurements to the utility function.

17. A system configured to determine a quality-of-service for a mobile application running on a mobile device, comprising:
a monitoring system configured to connect with a mobile network; and
a monitoring application configured to run on the mobile device and to monitor a network usage pattern of the mobile application as the mobile application is running on the mobile device and communicating via the mobile network,
wherein the network usage pattern indicates whether the mobile application is transmitting or receiving application data to or from the mobile network,
the monitoring application is configured to emulate the network usage pattern of the mobile application in receiving the application data by receiving a first set of test data from the monitoring system, and
the monitoring application is configured to determine the quality-of-service for the mobile application by analyzing the received first set of test data.

18. The system as recited in claim 17, wherein
the monitoring system is configured to emulate the network usage pattern of the mobile application in receiving the application data by transmitting the first set of test data to the monitoring application and receiving a second set of test data from the monitoring application, and the monitoring system is configured to determine the quality-of-service for the mobile application by analyzing the first set of test data and the second set of test data.

19. The system as recited in claim 17, wherein the monitoring application is configured to emulate the network usage pattern of the mobile application in transmitting the application data by transmitting a third set of test data to the monitoring system, and the monitoring system is configured to determine the quality-of-service for the mobile application by analyzing the third set of test data.

20. The system as recited in claim 17, further comprising:

a monitoring queue coupled with the monitoring application and the monitoring system, wherein the monitoring queue is configured to store the first set of data and associate the first set of data with the mobile application.

* * * * *